H. M. CANNON.
AUTOMOBILE SHOE.
APPLICATION FILED APR. 2, 1919.
1,356,963. Patented Oct. 26, 1920.
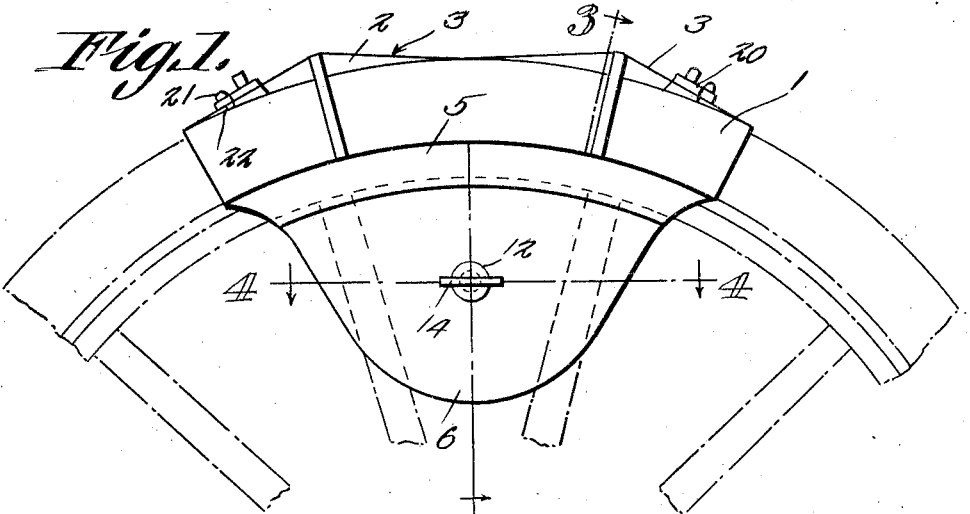
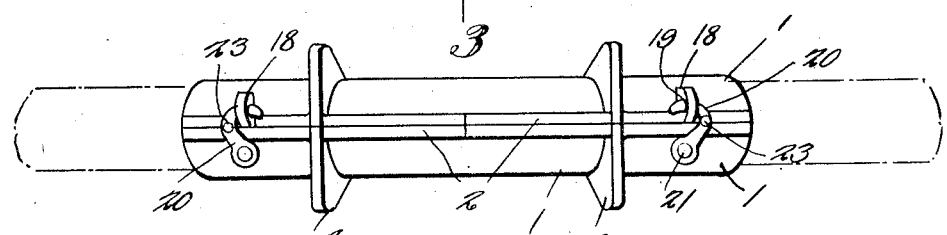
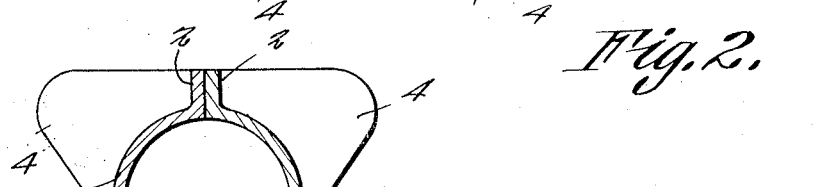
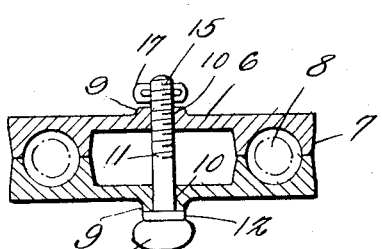
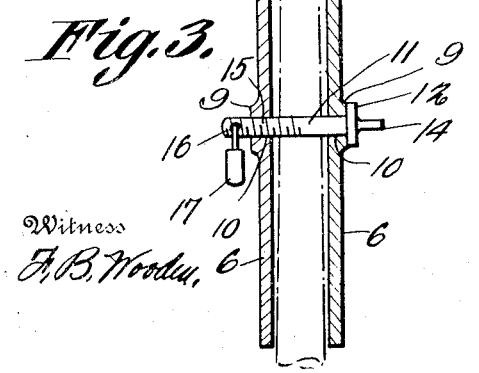
Inventor,
H. M. Cannon

UNITED STATES PATENT OFFICE.

HARRY M. CANNON, OF CORVALLIS, OREGON.

AUTOMOBILE-SHOE.

1,356,963.　　　　　　　　Specification of Letters Patent.　　Patented Oct. 26, 1920.

Application filed April 2, 1919. Serial No. 286,818.

*To all whom it may concern:*

Be it known that I, HARRY M. CANNON, a citizen of the United States, residing at Corvallis, in the county of Benton and State of Oregon, have invented a new and useful Automobile-Shoe, of which the following is a specification.

The device forming the subject matter of this application is a shoe, adapted to be applied to a vehicle wheel for the purpose of aiding in lifting a stalled vehicle out of the mud, and the invention aims to provide novel means whereby the structure will be strengthened, and whereby an adequate hold on the ground will be obtained.

Another object of the invention is to provide novel means for connecting the coöperating parts of the shoe.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—Figure 1 shows, in side elevation, a device constructed in accordance with the invention, a portion of a vehicle wheel and tire appearing in dot and dash line; Fig. 2 is an edge view of the device depicted in Fig. 1 of the drawings, a portion of the vehicle tire appearing in dot and dash lines; Fig. 3 is a radial transverse section taken approximately on the line 3—3 of Fig. 1, a portion of a vehicle wheel and the tire thereon appearing in dot and dash lines; Fig. 4 is a section taken on the line 4—4 of Fig. 1.

In carrying out the invention there is provided a pair of coöperating trough-shaped members 1 provided along their outer longitudinal edges with outwardly projecting flanges 2 which taper as indicated at 3, longitudinally of the structure, toward their ends. There are laterally projecting traction cleats on the members 1, the cleats denoted by the numeral 4, being connected with the flanges 2. The trough-shaped members 1 are adapted to embrace a vehicle tire closely, and merge into bulged parts 5 adapted to receive the rim of the wheel, the parts 6 having inwardly projecting ribs 7 provided with radial recesses 8 adapted to receive the spokes of a wheel. It is to be understood that the wings 6 may be of any desired extent, so as to grip or engage any number of spokes. The wings 6 are supplied with outwardly extended bosses 9 having openings 10 receiving a securing means, which may be in the form of a screw 11 provided with a head 12 carrying a finger piece 14, the head engaging the boss 9 on one wing 6, the screw being mounted in the openings 10 and being threaded as indicated at 15 into one of said openings. The free end of the screw 11 is supplied with an opening 16 adapted to receive the shackle of padlock 17. One of the trough-shaped members 1 carries projections 18 connected with the corresponding flange 2, the projections having openings 19 adapted to receive hooks 20 connected by pivot element 21 with bosses 22 on the other of the trough-shaped members 1. The hooks 20 may be provided with pins 23 or the like, whereby hooks may be manipulated, the hooks and the projections forming fasteners uniting the trough-shaped members 1 and extended across the flanges 2.

It will be obvious that a wheel carrying a device of the kind mentioned, will be so equipped that, when rotated, it will aid in lifting a stalled vehicle out of a mud hole, the function of the cleat 4 being obvious. The flanges 2 serve as reinforcements for the cleats 4 and, further, act as elements which tend to prevent lateral skidding. If the padlock 17 is mounted in one end of the screw 11 or if the screw is otherwise held in place against removal, the structure will tend to prevent the theft of the automobile, since it will be somewhat difficult to proceed with much speed if one or more of the wheels of the vehicle are equipped with my device forming the subject matter of this application.

Having thus described the invention, what is claimed is:—

A tire shoe comprising a pair of coöperating trough-shaped members provided with abutting longitudinal flanges disposed on opposite sides of the median plane of the shoe and extended along the tread thereof to form a reinforced rib the thickness of which is double the thickness of the stock out of which the trough-shaped members are made, each of said members being provided with a transverse cleat, the cleat of one member alined with the cleat of the other member transversely of the shoe, each cleat being integral with one of said members and with the flange thereof, to serve as a brace for the flange; and means for connecting said members.

In testimony that I claim the foregoing as my own, I have hereto affixed my signature in the presence of two witnesses.

HARRY M. CANNON.

Witnesses:
  PATRICIA GRAF,
  JAY F. LEWIS.